Figure 1:
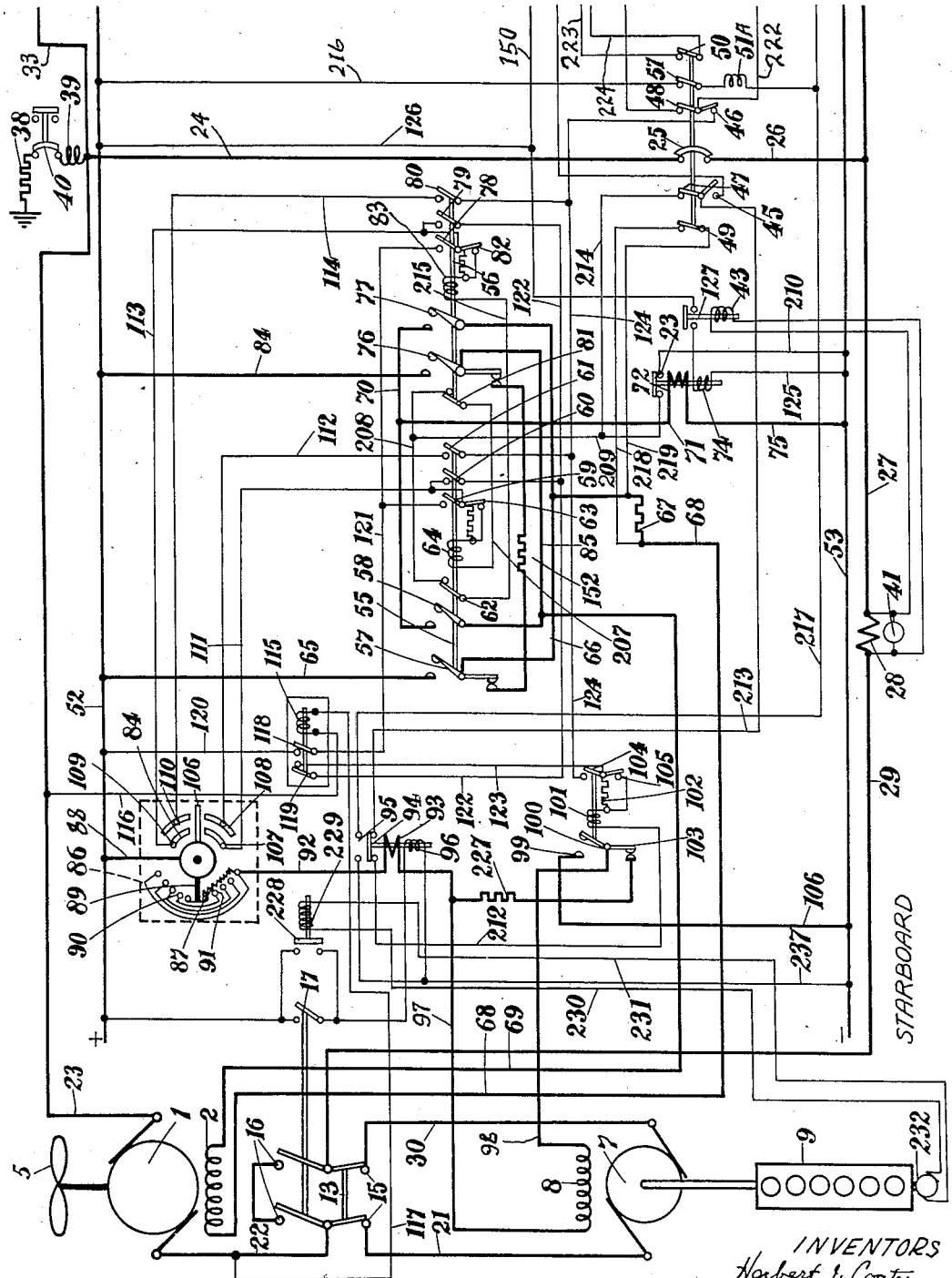

Patented Oct. 6, 1936

2,056,645

UNITED STATES PATENT OFFICE 2,056,645

ELECTRIC SHIP PROPULSION SYSTEM

Herbert John Coates, Erdington, Birmingham, and Sydney Albert George Emms, Leamington Spa, England, assignors to The General Electric Company Limited, London, England Application January 30, 1935, Serial No. 4,074
In Great Britain January 30, 1934

10 Claims. (Cl. 172—8)

This invention relates to electric ship propulsion systems, one object being the provision of improved, flexible and convenient control arrangements for ship propulsion systems comprising port and starboard motors associated with a plurality of generators, another object being to provide for the control of motors in a direct current system in such a way that motors may be fed with power from a common generator and may safely and separately be reversed.

In an electric ship propulsion system according to one aspect of the invention a plurality of direct current motors are arranged to be fed from a common generator and speed control is effected by variation of generator voltage and reversal of motor is effected by reversal of its field excitation, whilst means are provided whereby reversal can only occur when the voltage across the main motor circuit has been suitably reduced.

In an electric ship propulsion system in accordance with another aspect of the invention, moreover, separate controllers are provided for respectively controlling both the speed and direction of rotation of port and starboard motors arranged to be supplied with power from separate generators and the port and starboard motors are also arranged to be supplied with power from the same generator whilst under the latter operating conditions either controller may be operated to reduce the generator voltage prior to effecting reversal of the direction of rotation of a motor.

Thus in one arrangement port and starboard direct current motors are arranged to be fed with power from separate generators or from a common generator and separate controllers are provided for controlling both the speed of the port and starboard motors respectively by variation of generator voltage and the direction of rotation of port and starboard motors respectively by reversal of field excitation of the motors, and the control gear is so arranged that when the motors are fed with power from a common generator either controller may be operated to reduce the generator voltage prior to effecting reversal of the direction of rotation of a motor, whilst means are provided whereby whether the motors are fed with power from separate generators or from a common generator, reversal of a motor can occur only when the voltage across the main motor circuit has been suitably reduced.

Switching means controlling the operative connection of the motors with the different generators are preferably provided with auxiliary contacts for determining whether the port and starboard controllers shall control the generators severally associated with port and starboard motors or whether the said controllers shall both control a generator associated with port and starboard motors.

Furthermore, the motor field contactors are provided with auxiliary contacts which exert an interlocking action such that when a control is exerted to effect starting or reversal of a motor or motors associated with a generator, operation of a generator field switch which controls the supply of power to the motor or motors is permitted only after closure of the appropriate motor field contactor or contactors. Normally the generator field switch is controlled independently of the said auxiliary contacts by the controller or controllers for the said motor or motors.

A voltage relay prevents reversal of a motor unless the line voltage is below a predetermined value.

Preferably means are provided whereby upon the occurrence of a state or condition indicative of a faulty generator or prime mover in the port or starboard propulsion plant means influenced by the said state or condition effect a control whereby the sound plant supplies power to the motor or motors of the faulty plant. Thus the main electrical circuits of the port and starboard power plants may include a common conductor comprising a switching device opening of which results in the port and starboard motors being connected effectively in series.

In such an arrangement, this switching device is provided with auxiliary contacts for determining whether the port and starboard controllers shall control the generators severally associated with port and starboard motors or whether the said controllers shall both control a generator associated with port and starboard motors. The motors and generators are then provided with individual isolating switches which when opened maintain the continuity of the main circuit past the motor or generator.

Figure 2:
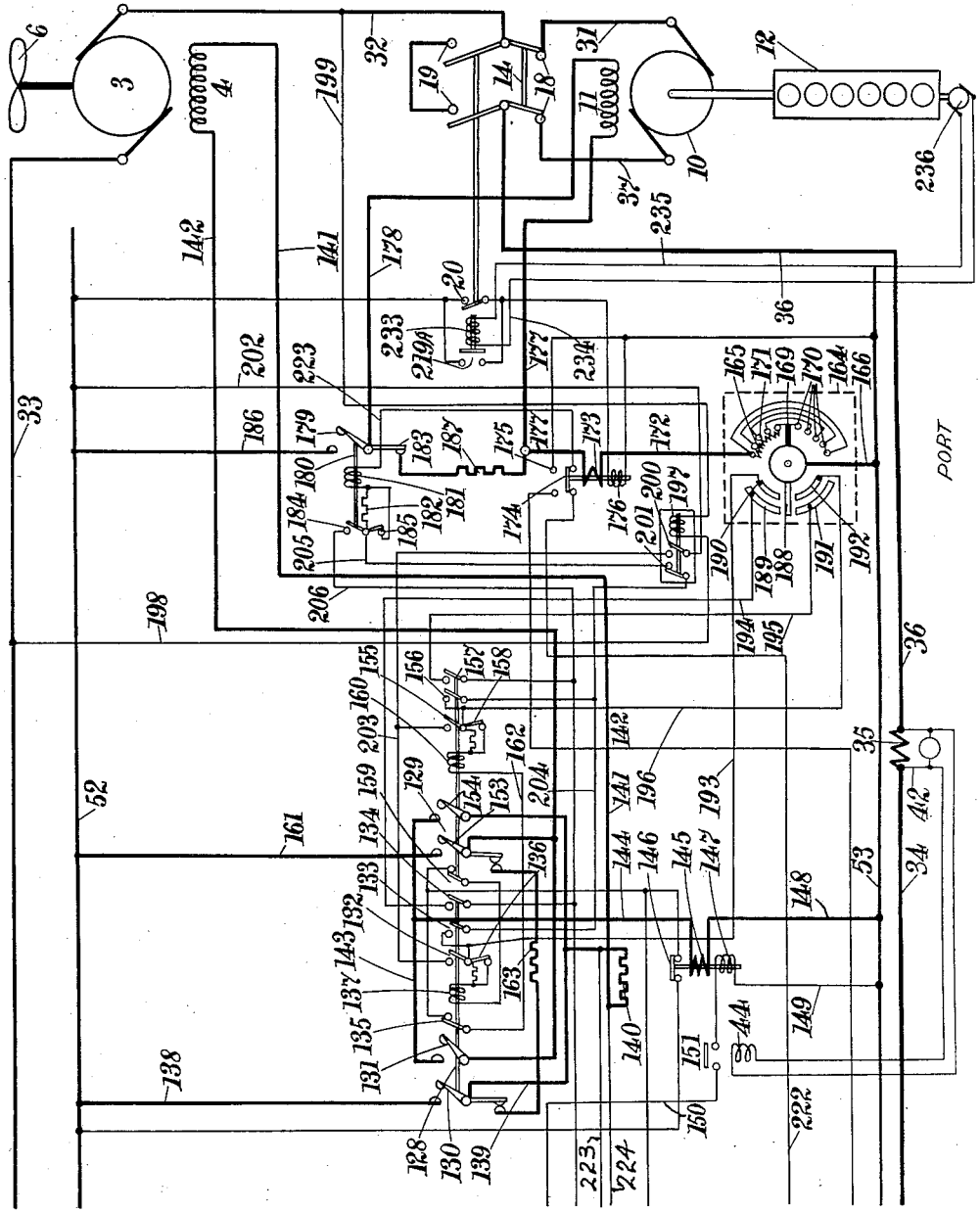

One arrangement in accordance with the invention will now be described by way of example with reference to the accompanying diagrammatic drawings, Figures 1 and 2, in which are shown the main propulsion current and control circuits for a twin-screw Diesel-electric vessel, having two direct current generators each driven by a Diesel engine and delivering power to two direct current motors driving the screws. The drawings have for convenience been divided, the circuits associated with the starboard motor being shown on one sheet Figure 1 and the circuits associated with the port motor being shown on the second sheet Figure 2, the interconnecting circuits being indicated as extending out of Sheet 1 to the right and out of Sheet 2 to the left.

In the drawings, the starboard motor driving the starboard screw 5 is provided with an armature 1 and a shunt field winding 2 while the port motor driving the port screw 6 is provided with an armature 3 and a shunt field winding 4. The starboard motor is arranged to be supplied with current from the starboard generator having an armature 7 and a separately excited shunt field 8 and driven by a Diesel engine 9. Similarly the port motor is arranged to be supplied with current from the port generator which has an armature 10, a separately excited shunt field winding 11 and is driven by a second Diesel engine 12.

Between the generators and motor of both port and starboard sides are arranged double pole changeover make-before-break switches 13 and 14 respectively. The starboard switch 13 makes with contacts 15 and 16, making at lower contacts 15 before opening upper contacts 16 and vice versa; in addition an auxiliary switch 17 is provided, the closure of which is effected on closure of the switch 13 at its upper contacts 16. The switch 17 is paralleled by "underspeed" contacts 228. The contacts 228 are normally held open by a coil 229 energized over lines 230, 231 from a small dynamoelectric machine 232 driven by the prime-mover 9, the arrangement being such that upon underspeed of the prime-mover 9 occurring the contacts 228 are closed. Similarly the port switch 14 makes with contacts 18 and 19, making at lower contacts 18 before breaking at upper contacts 19 and vice versa; in addition an auxiliary switch 20 is provided which opens and closes with the opening and closing of the switch 14 at the upper contacts 19. The switch 20 is also paralleled by "underspeed" contacts 219 operated by a coil 233 energized over lines 234 and 235 from generator means 236 coupled to the prime mover 12 and arranged so that the contacts 219 are closed when the prime mover speed decreases below a predetermined limit. The underspeed contacts 228 and 219A could alternatively be operated by mechanical tachometers on the respective main shafts.

With the starboard selector switch 13 in its lower position, i. e. making at contacts 15 (which is its normal position) the generator motor circuit is completed from one side of the generator armature 7 over the line 21, left-hand contact 15 of switch 13, line 22, armature of the starboard motor 1, line 23, common line 24, circuit breaker contacts 25 which are normally closed, common line 26, line 27, instrument shunt 28, line 29, right hand contact 15 of switch 13 and line 30, to the other side of the generator armature.

In a similar manner, with the port generator selector switch 14 in its normal position in which contacts 18 are made, the generator motor circuit is completed from one side of the generator armature 10 over line 31, right hand contact 18 of switch 14, line 32, motor armature 3, line 33, common line 24, circuit breaker contacts 25, line 26, line 34, instrument shunt 35, line 36, left-hand contact 18 of the switch 14, line 37 to the other side of the generator armature 10.

The conductors 24 and 26 which are common to the generator motor circuits of both port and starboard sides are adapted to carry twice the maximum current of a generator.

The common conductor 24 is earthed through a resistance 38 and the coil 39 of an earth leakage protective or alarm relay and the contacts 40 of an earth connection circuit breaker. Across the two shunts 28 and 35 are connected ammeters 41 and 42 and the coils 43, 44 of overcurrent relay devices having contacts 127 and 151.

Associated with the main contacts 25 of the contactor in the line 24 are auxiliary contacts 45, 46, which are closed when the contactor is in the "off" position and auxiliary contacts 47, 48, 49, 50 and 51 which are closed when the main contacts 25 are closed. This contactor is also provided with an operating coil 51A.

Referring now particularly to the starboard gear, the excitation current for both motor and generator fields 2 and 8 is derived from positive and negative bus-bars 52 and 53 respectively. These bus-bars, which also supply control circuit current, are energized from an auxiliary generator set, not shown.

The direction of rotation of the motor 1 is determined by the direction of current flow through the motor field 2. Accordingly an "ahead" contactor 55 and an "astern" contactor 56 are provided. The "ahead" contactor 55 comprises normally open main contacts 57, 58, normally open auxiliary contacts 59, 60, 61 and normally closed auxiliary contacts 62 and 63 and an operating winding 64. On closing this contactor, an "ahead" circuit is completed from positive bus-bar 52 over line 65, through contacts 57, over line 66, resistance 67, line 68, motor field 2, line 69, contacts 58, lines 70 and 71, coil 72 of a starboard motor field overload relay having normally closed contacts 73 and a further trip coil 74, and line 75 to the negative bus 53. The additional trip coil 74 is arranged to be energized over lines 125, 126 on closure of the contacts 127 which are the contacts of the overcurrent relay device having the coil 43.

Similarly the "astern" contactor 56 comprises normally open main contacts 76, and 77, normally open auxiliary contacts 78, 79 and 80 and normally closed auxiliary contacts 81 and 82 and a closing winding 83. On closing this contactor, an "astern" circuit is completed from the positive bus-bar 52 over line 84, contacts 76, line 85, line 69, motor field 2, line 68, resistance 67, line 66, contacts 77, line 70, line 71, coil 72 and line 75 to the negative bus-bar 53. The main contactors 57 and 76 are arranged when open to complete a circuit through a discharge resistance 152.

Speed control to the motor is exerted by variation of the generator field voltage, this is effected by varying the amount of resistance in series with the field 8. Accordingly in the starboard controller 86 (which will more fully be described hereinafter) there is provided a tapped resistance 87. This is arranged to be connected in a circuit from positive bus-bar 52, line 88, brush 89 contacting with studs 90 or 91 according as movement is to be "ahead" or "astern", sections of the resistance 87, line 92, coil 93 of the starboard generator field overload relay having normally closed contacts 94, normally open contacts 95 and a shunt trip coil 96, line 97, generator field 8, line 98, contacts 99 of the generator field contactor 100 (having an operating coil 101, an economy resistance 102, contacts 103 opening when the main contacts 99 close and auxiliary contacts 104 and 105) and line 106 to the negative bus-bar 53.

The contacts 103 when closed complete a circuit through the discharge resistance 227.

The starboard controller 86, previously mentioned, comprises a movable element carrying brushes 89 and 106 which are both connected through 88 to the positive bus-bar 52. The controller conveniently externally is in the form of a normal type ships-telegraph, and comprises a handle connected to the brush elements 89 and 106 and having a neutral "off" mid-position from which it can be moved in either direction, one direction corresponding to motion "ahead" and the other to motion "astern". The degree of movement of the handle from the mid-position in either direction determines the motor speed, by the cutting in or out of the resistance 87 on engagement of the brush 89 with the various studs of the sets 90 and 91.

The controller brush 106 is the brush which is concerned with the direction setting; the brush 106 is arranged to engage tail rings 107, 108 in the "ahead" position and 109, 110 when in an "astern" position. The ring 107 is connected by a line 111 to one side of the auxiliary contacts 59 and 60 of the "ahead" direction contactor 55, whilst the ring 108 is connected by a line 112 with the auxiliary contact 61 of the same direction contactor. The controller "astern" ring 109 is connected by a line 113 with one side of the auxiliary contacts 78 and 79 of the "astern" direction contactor 56, whilst the ring 110 is connected by a line 114 to the auxiliary contact 80.

In addition to the previously described relays, there is provided on the starboard side a low voltage interlock contactor for starboard control having a winding 115 connected by lines 116 and 117 across the motor armature 1, and normally open contacts 118 and normally closed contacts 119.

The normally open contacts 118 are arranged to be connected in a circuit extending from the positive bus-bar 52 over lines 120 and 121 to one side of contacts 59 and 78 of the "ahead" and "astern" contactors. The normally closed contacts 119 are connected in a circuit from positive bus-bar 52 through 88, brush 106 and either over line 111 and contacts 60 or over line 113 and contacts 79 dependent on which direction contactor is closed, to a line 122. The other side of the contacts 119 are connected through a line 123 and normally open contacts 104 of the starboard generator field contactor to a line 124.

Referring now particularly to the port gear, the excitation current for both motor and generator fields 4 and 11 is also derived from the positive and negative bus-bars 52 and 53 respectively.

The direction of rotation of the port motor is determined by the direction of current flow through the motor field 4. Accordingly an "ahead" contactor 128 and an "astern" contactor 129 are provided. The "ahead" contactor 128 comprises normally open main contacts 130, 131, normally open auxiliary contacts 132, 133 and 134 and normally closed auxiliary contacts 135 and 136 and an operating winding 137.

On closing the "ahead" contactor 128, an "ahead" circuit is completed from positive bus-bar 52 over line 138, contacts 130, over line 139, resistance 140, line 141, motor field 4, line 142, contacts 131, lines 143, and 144, coil 145 of a starboard motor field overload relay having normally closed contacts 146 and a further trip coil 147, and line 148 to the negative bus-bar 53.

The additional trip coil 147 is arranged to be energized over lines 149, 150 and 126 on closure of the contacts 151 which are the contacts of the overcurrent relay device having the operating coil 44.

Similarly the "astern" contactor 129 comprises normally open main contacts 153 and 154, normally open auxiliary contacts 155, 156 and 157 and normally closed auxiliary contacts 158 and 159 and a closing winding 160. On closing this contactor, an "astern" circuit is completed from the positive bus-bar 52 over line 161, contacts 153, line 142, motor field 4, line 141, resistance 140, line 162, contacts 154, line 143, line 144, coil 145 and line 148 to the negative bus 53.

The main contactors 130 and 153 are arranged when open to complete a circuit through the discharge resistance 163.

Speed control of the motor is exerted by variation of the amount of resistance in series with the generator field 11. Accordingly in the port controller 164 is provided a tapped resistance 165. This is arranged to be connected in a circuit from negative bus-bar 53, line 166, brush 169 contacting with studs 170 or 171 according as movement is to be "ahead" or "astern," sections of the resistance 165, line 172, coil 173 of the port generator field overload relay having normally closed contacts 174, normally open contacts 175 and a shunt trip coil 176, line 177, generator field 11, line 178, contacts 179 of the generator field contactor 180 (having an operating coil 181, an associated economy resistance 182, contacts 183 opening when the main contacts 180 close, which contacts 183 on closing make a circuit through a discharge resistance 187, and auxiliary contacts 184 and 185) and line 186 to the positive bus-bar 52.

The port controller 164 comprises a movable element carrying brushes 169 and 188 which are both connected to the negative bus-bar 53 through 166. The controller, which is similar to the starboard controller 86, conveniently externally is in the form of a normal type ship telegraph and comprises a handle connected to the brush elements 169 and 188 which handle has a neutral "off" mid-position from which it can be moved in either direction, one direction corresponding to motion "ahead" and the other direction corresponding to motion "astern". The degree of movement of the handle from the mid-position, in either direction, determines the motor speed by the cutting in or out of the resistance 165 on engagement of the brush 169 with the stud sets 170 or 171.

The brush 188 is the brush which is concerned with the direction control; the brush 188 is arranged to engage tail rings 189 and 190 when in an "ahead" position and tail rings 191 and 192 when in an "astern" position. The ring 190 is connected by a line 193 to one side of the auxiliary contacts 133 and 136 of the "ahead" direction contactor 128, whilst the ring 189 is connected by a line 194 to the auxiliary contact 134 of the same direction contactor. The astern ring 191 is connected by a line 195 to the auxiliary contact 157 of the "astern" direction contactor 129 and the remaining "astern" ring 192 is connected by a line 196 to the auxiliary contacts 156 and 158 of the "astern" direction contactor 129.

In addition to the previously described relays associated with the port-side gear, there is provided a low voltage interlock contactor having an exciting winding 197 connected by lines 198 and 199 across the motor armature 3, and normally open contacts 200 and normally closed contacts 201.

The normally open contacts 200 are arranged to be connected in a circuit extending from the positive bus-bar 52 over lines 202 and 203 to one side of contacts 132 and 155 of the port "ahead" and "astern" direction contactors.

The normally closed contacts 201 are connected on one side in a circuit from the negative bus-bar 53 and either over line 196 and contacts 156 or over line 193 and contacts 133 (dependent on which direction contactor is closed) to a line 204 connected to one side of the contacts 201. The other side of the contacts 201 is connected through a line 205 and normally open contacts 184 of the port generator field contactor to a line 206.

In order that a clear understanding of the invention may be attained, there will now be described the co-ordinated control and operation of the system. In the diagram the control for the Diesel engines is not shown and it is hereafter assumed that these have on starting been run up to a substantially constant speed, at which speed they are maintained. As shown in the drawing the common connection switch 25 is in the closed position, the generator selector switches 13 and 14 are both in the "generator-in" position in which contacts are respectively made at contacts 15 and 18, the controllers are both in the off position and all field contactors etc., are open.

Referring now to the starboard side, suppose the controller handle is moved to the full ahead or forward position, the brush 106 then moves onto the tail rings 107 and 108 and connects these rings to the positive supply bus 52. A circuit is then completed from bus 52 through the ring 107, over line 111, contact 63, coil 64, line 207, interlock contact 81 of the "astern" contactor (the interlock contacts 81 and 62 ensure that one contactor cannot be closed without first opening the other contactor), line 208, line 209, contacts 73 and line 210 to the negative bus-bar 53. The "ahead" contactor therefore closes and in so doing makes a maintaining circuit for itself through the economy resistance 211.

At the closing of the "ahead" contactor a circuit is completed from the positive bus-bar 52 through the brush 106, tail ring 107, line 111, contact 60, line 122, contacts 119 on the interlock contactor, line 123, contact 105 of the generator field contactor, coil 101 of the same contactor, line 212, contacts 94 of the generator field overload relay, line 213, contact 47 of the common connection switch 25, line 214, contacts 73 of the motor field overload contactor and line 210 to the negative bus-bar 53. Accordingly the generator field contactor 100 closes its contacts 99, making a retaining circuit for itself through an economy resistance 102.

The generator field is then energized and the generator voltage accordingly begins to build up and the motor commences to run up ahead.

At a predetermined setting (upper limit) of the generator voltage, the interlock contactor (circuit 116, 117 through coil 115) opens its contacts 119 and closes its contacts 118. The closing of the contacts 118 causes the "ahead" contactor contacts to be retained closed directly from the positive bus 52 over the line 120 and line 121 and through contacts 59. On the other hand, the opening of the contacts 119 interrupts one of the retaining circuits for the generator field contactor 100, which, however, is still retained over a second retaining circuit from bus-bar 52, brush 106, tail ring 108, line 112, contact 61, line 124 and the remaining part of the similar circuit detailed above.

The speed control of the motor is then exerted by moving the controller to the various "ahead" operative positions, the speed being controlled by control of the generator excitation by the insertion of the resistance 87 in series with the generator field.

The port motor is run up to speed in an exactly similar manner.

If now the starboard controller is moved from an "ahead" position to an "astern" position, when the brush 106 disengages the tail ring 108, the maintenance circuit for the starboard generator field, previously detailed, is interrupted and the generator field is accordingly de-energized. The motor field "ahead" contactor 55 is, however, maintained closed over the circuit through the contacts 118; when, however, the voltage across armature 1 dies away as the generator voltage falls, the interlock relay opens this contact 118 and closes the contact 119. The "ahead" direction contactor accordingly opens. The "astern" contactor then closes since a circuit is completed over brush 106 at ring 109 and over line 113, coil 83, line 215, interlock contact 62 on the "ahead" contactor, lines 208, 209, contacts 73 of the motor field overload relay and line 210 to the negative bus-bar 53. The further sequence of events until the motor is up to speed is thereafter identical with that previously described for the "ahead" operation.

It will be seen that motor field reversals can only take place with a low voltage from the generator and in this manner heavy overcurrents are prevented during reversal. Moreover, the retention of the motor field after interruption of the generator field circuit results in rapid deceleration of the propeller while the generator voltage is falling to the low value, with the advantageous result that upon reversal of the motor field and re-energization of the generator field, the propulsion motor is quickly reversed without danger of flash-over on the motor which might occur if the motor field were reversed while the voltage of the associated generator was high. If now both motors are assumed to be rotating ahead, both controllers being in the "ahead" position, it will be seen that on failure of the starboard Diesel engine driving the generator 7, that is when the speed of the prime mover 9 decreases below the predetermined limit, the output of the small generator 232 on the engine decreases so that the coil 229 releases the contact maker and the contacts 228 are closed, and by closing complete a circuit from the positive bus-bar 52 through the trip coil 96 to the negative bus-bar 53. The contacts 94 are thereupon opened, and the retaining circuit for the generator field contactor is immediately opened. The contacts 95 are, however, closed with the result that a circuit is completed from the positive bus 52 over line 216, contacts 51, trip coil 51A of the common connection switch, line 217, contacts 95 and line 237 to the negative bus-bar 53.

The common connection switch 25 is then immediately tripped open and auxiliary contacts 49, 47, 48, 51 and 50 are opened whilst contacts 45 and 46 are closed.

It will be seen that the control thus exerted by the underspeed contacts 228 can also be effected if the generator switch 13 is thrown over to close the auxiliary switch 17, or if an overcurrent passes in the generator field 8 (in which case the trip coil 93 becomes effective).

The opening of the switch 25, as previously described, causes the de-energization of the field of the starboard generator, whilst the two motors will then be connected in series with the port generator over lines 37, 36, 34, 27, 29, 30, dead armature 7, lines 21, 22, motor armature 1, lines 23, 33, motor armature 3 and lines 32 and 31. The two motors will then be running in series at half voltage each from the port generator.

The starboard generator can now be removed from the system by throwing over the switch 13 which being of the make before break pattern, first short circuits the dead armature 7 of the starboard generator, and then finally opens this armature circuit, leaving the motor circuits made through the upper contacts 16 of the switch 13.

As previously mentioned on opening the switch 25 the auxiliary contacts 49 and 50 are opened, so that the short circuit which these normally exert over lines 218, 219, 223 and 224 on the resistances 67 and 140 respectively, is removed. Since these resistances are not normally connected in the motor field circuits, the insertion thereof in the motor fields 2 and 4 which have only half normal armature voltage are enabled to take up a speed which will absorb the full output of the port generator remaining in circuit.

Moreover the contacts 47 and 48 associated with the common connection switch 25 are opened and the contacts 45 and 46 associated with the same switch are closed. The circuit for the port generator field contactor 180 is then completed from the positive bus-bar 52 through the brush 196 and ring 108 of the starboard controller, over line 112, contacts 61, line 124, contacts 46, line 222, contacts 174 of the port side overcurrent relay, line 223, coil 181, line 205, contact 201, line 204, contacts 133 of port "ahead" contactor, line 193, tail ring 190, brush 188, line 166 to the negative bus-bar 53.

Thus movement of either starboard or port controller to or through the stop position is now effective to open the port side generator field contactor so that either motor may still be reversed independently of the other, but only when the generator voltage has been brought to a low value. Control of speed, however, for both motors then depends on the position of the port controller only for the resistance 165 of this controller controls excitation of the port generator field 11.

It must be appreciated that if alternatively the port generator fails, both motors are then fed from the starboard generator.

Alternative to the control effected on failure of one generator, suppose now that both engines are in use and both motors are running, the common connection switch 25 being closed, and that the starboard side motor develops an internal short circuit. A heavy current then flows in the starboard side of the system (any excess of this beyond the normal current of the port side flows via the common connection 24, 25, 26;) and this heavy current on the starboard side is felt at 28 and through the coil 43 operates the overcurrent relay 127 which closes its contacts, thereby closing the trip coil 74 of the starboard motor field overload contactor 73 which then opens its contacts 73.

The opening of these contacts 73 causes the deenergization of both the coil 64 of the starboard motor field contactor and the coil 101 of the starboard generator field contactor so that both starboard motor and starboard generator are put out of commission. The port side is still left in operation however. In an alternative arrangement the overcurrent relay of each side may be caused to shut down both sides of the vessel upon the one motor field failing.

Generally, when the port and starboard power plants each include more than one motor or generator and one or more motors are arranged to be connected in series, upon a machine being rendered inoperative, other machines remaining in operation, adjustment of means for controlling the motor or motors remaining on operation may automatically be effected in order to regulate the speed and/or output of the motors to a suitable or efficient value. Thus if there are two port motors and generators and two starboard motors and generators and one generator fails the field strength of the motors associated with the remaining generator is automatically weakened, whilst if one motor fails the fields of the associated generators are weakened.

Suitably in an arrangement in accordance with the invention, the controllers 86 and 164 are located on the bridge of the vessel, in which case a changeover transfer switch will generally be provided whereby the control may be transferred to duplicate controllers in the engine room. In such an arrangement it is preferably arranged so that the moving element of each controller makes with a fixed contact in the "off" position and an electric interlock is provided through these contacts which prevents change-over from bridge to engine room control or vice-versa unless all controllers have first been put in a stop position when a latch on the transfer switch would be released.

Whilst the control which retains the motor field energized on reversal until the voltage across the main motor circuit has been suitably reduced, has been described which is effected by voltage responsive relays, the control may be effected by time delay means. As a further alternative, it may be arranged that the controllers may be motor operated, (operated from the bridge through known remote follow-up control), and be such that the time of travel from "full ahead" to "full astern" or vice versa could be adjusted to prevent over-rapid operation of the various field contactors.

We claim:—

1. An electric ship propulsion system comprising direct current starboard and port propulsion motors, prime mover driven direct current starboard and port generators, circuits between the respective generators and motors in which the current flows in the same direction, said circuits having a common return line, a circuit breaker in said common return line which when open places the generator motor circuits in series, starboard and port controllers, ahead and astern contactors for each motor arranged to be operated by the respective starboard and port controllers for reversing the direction of rotation of the respective motors while the direction of current flow of the generators remains the same and means for operating both motors from one generator when said circuit breaker is opened and continuing control of the motors from the respective controllers.

2. The electric ship propulsion system as in claim 1 wherein tapped resistance in the generator field circuit associated with each controller is provided for controlling the voltage of the respective generator motor circuits and means is provided for eliminating voltage control of the motor circuit from the controller of an out of commission generator when both motors are in circuit with one generator.

3. An electric ship propulsion system comprising starboard and port propulsion motors, prime mover driven starboard and port generators, ahead and astern contactors for the respective motors for controlling the direction of rotation of the motors, starboard and port controllers for actuating the ahead and astern contactors of the respective motors, relay coils for operating the ahead and astern contactors, auxiliary direct current supply means, circuit closing arms on the respective controllers arranged to complete circuits between said mains for energizing the ahead and astern relay coils, the circuit closing arms of one of said controllers being connected to the positive main and of the other to the negative main, means for cutting out one generator and operating the motors on the other generator and means including circuit connections between said mains through the circuit closing arms of both controllers for controlling the operating generator from either controller when one generator is cut out.

4. The electric ship propulsion system as in claim 3 wherein said generators are provided with field coil circuits arranged to be energized from said auxiliary supply mains through the circuit closing arms of the respective controllers, with circuit connections from the respective controllers for operating generator field contactors for closing the field circuits of the respective generators and tapped resistance coils associated with the respective controllers are provided for regulating the current in said generator field coils.

5. An electric ship propulsion system comprising starboard and port propulsion motors, a pair of prime movers operating starboard and port generators for operating respective motors, starboard and port controllers, auxiliary direct current mains, contact brushes for the respective controllers connected respectively to the positive and negative of said auxiliary direct current mains, field coils for the respective propulsion motors, ahead and astern contactors for completing circuits from said auxiliary mains through the respective motor field coils for direct and reverse rotation of the motors, circuits arranged to be completed by the respective controller brushes for operating the associated ahead and astern contactors and means for interrupting the respective contactor operating circuits when the current in the motor field coils exceeds a predetermined amount.

6. The electric ship propulsion system as in claim 5, wherein the circuits for operating the propulsion motors by current from the respective generators are provided with means for interrupting the controller field contactor circuits when the corresponding generator currents exceeds a predetermined amount.

7. The electric ship propulsion system as in claim 5 wherein a circuit breaker is provided in a circuit between the motors and arranged to be operated when one generator is cut out and the motors are operated in series, the respective motor field circuits including resistances normally short circuited and contacts are arranged to be opened with the opening of said circuit breaker for eliminating said short circuits when the motors are operated in series.

8. The electric ship propulsion system as in claim 5, wherein the respective generators are provided with field coils arranged to be energized from said auxiliary mains and generator field coil contactors are arranged to be operated by current from said mains through circuits operating through the respective controllers and through the associated ahead and astern contactors for operating the respective generator field contactors, said field contactors for closing the generator field coil circuits being operated only after the associated ahead and astern contactors are operated.

9. The electric ship propulsion system as in claim 1 wherein voltage relays across the respective motor circuits having circuit connections in cooperation with the respective ahead and astern contactors are adapted for retaining operated contactors effective to maintain the respective motors in circuit until the voltage in the generator motor circuit is reduced to a predetermined amount when the controllers are moved to effect a reverse.

10. The electric ship propulsion system as in claim 1 wherein circuits having contacts associated with said circuit breaker are provided for effecting reduction of the voltage in the generator-motor circuit from either controller when both motors are operating from one generator.

HERBERT J. COATES.
S. A. G. EMMS.